United States Patent [19]

Hautvast et al.

[11] Patent Number: 5,069,624
[45] Date of Patent: Dec. 3, 1991

[54] CONTACT ARRANGEMENT FOR ELECTRICAL INTERROGATION OF THE DATA OF A WHEEL REVOLUTION COUNTER

[75] Inventors: Heinz-Josef Hautvast, Brigachtal; Jürgen Adams, Villingen-Schwenningen; Isa Sieber, Unterkirnach, all of Fed. Rep. of Germany

[73] Assignee: Mannesmann Kienzle GmbH, Villingen-Schwenningen, Fed. Rep. of Germany

[21] Appl. No.: 669,909

[22] Filed: Mar. 15, 1991

[30] Foreign Application Priority Data

Mar. 15, 1990 [DE] Fed. Rep. of Germany ....... 4008162

[51] Int. Cl.$^5$ ............................................ H01R 39/00
[52] U.S. Cl. ..................................... 439/16; 439/736; 439/22; 235/95 B
[58] Field of Search ....................... 439/13, 16, 22, 21, 439/27, 34, 660, 733, 736, 886, 936; 235/95 R, 95 B, 97, 103

[56] References Cited

U.S. PATENT DOCUMENTS

| | | | |
|---|---|---|---|
| 3,007,130 | 10/1961 | Martin | 439/736 |
| 3,479,632 | 11/1969 | Galles | 439/21 X |
| 3,786,376 | 1/1974 | Munson et al. | 439/21 X |
| 4,697,278 | 9/1987 | Fleischer | 235/95 B |
| 4,715,828 | 12/1987 | Landrevie | 439/660 |
| 4,773,866 | 9/1988 | Basques | 439/22 |

*Primary Examiner*—Larry I. Schwartz
*Assistant Examiner*—Khiem Nguyen
*Attorney, Agent, or Firm*—Toren, McGeady & Associates

[57] ABSTRACT

A contact arrangement for interrogating the data and counting values of a wheel revolution counter. The contact arrangement is accessible from the outside at an otherwise hermetically closed housing. The wheel revolution counter is conventionally fastened at a wheel hub of a vehicle in a cantilevering manner. The contact arrangement comprises a contact plate which is fastened axially in the front housing wall together with an insulating bush having a collar serving as a spacer. An adhesive layer fills the gap between the contact plate and the housing. This adhesive layer extends out on the outer surface of the housing and separates the outer surface of the contact plate and the end face of the housing with an insulating layer covering a large surface area.

11 Claims, 2 Drawing Sheets

CONTACT ARRANGEMENT FOR ELECTRICAL INTERROGATION OF THE DATA OF A WHEEL REVOLUTION COUNTER

The invention is directed to a contact arrangement for the electrical interrogation of the data of a wheel revolution counter.

BACKGROUND OF THE INVENTION

Wheel revolution counters typically comprise a substantially cylindrical, metallic housing, means at one end of the housing for a cantilevering or overhanging fastening of the wheel revolution counter at a wheel hub of a motor vehicle, and at least one contact part electrically insulated relative to the housing and fastened at the housing's other end. When the distances covered by motor vehicles, trailers or semi-trailers are to be determined in an extensively tamper-proof manner, e.g., because the kilometers traveled by these vehicles are to be taxed, it is conventional to use such wheel revolution counters as distance counters. The latter are usually attached directly to the wheel hub of the respective vehicle and accordingly require neither flexible shafts nor electrical cables for the transmission of the measured values. Since distance counters of this type revolve with the vehicle wheel to which they are assigned, it is necessary for the counting process to provide a zero comparison rate of revolutions, which is usually realized by means of a pendulum supported in the wheel revolution counter.

In order to be able to assign the current kilometer status to a determined vehicle, which is compulsory in the event that distances are to be taxed, the wheel revolution counter must also supply identification information in addition to the kilometer status. This data is, of course, also useful for checking maintenance intervals, for monitoring wear, making transport calculations, or for determining the running performance of rented vehicles.

In DE C 38 41 509, a wheel revolution counter is suggested which, in contrast to known printing wheel revolution counters, is constructed as a hermetically closed plug-in connection part from which the data can be extracted via contacts. The contacts are preferably constructed on the front side and in a planar manner at this wheel revolution counter, which comprises a substantially cylindrical housing, so that there is no construction space requirement inside the device and the plug-in connection is independent of the penetration of dirt; in other words, the inevitable dirt in the environment of use can be removed. The plug-in connection, via which the data exchange is effected, is further constructed with at least one self-enclosed contact path in such a way that a position-independent coupling of an autonomous data transfer device, or a "plug" connected with a cable, or a sensing or scanning head of a data transfer device, is provided.

The advantage of this electrical coupling consists in that the energy for reading out the data can be supplied externally to the wheel revolution counter. In so doing, a minimum of contacts can be achieved by means of selecting a suitable data transmission process, namely, a serial data transmission process, in connection with a suitable data transmission control. In contrast, optical and inductive or capacitive transmission means are relatively unsuited for such use due to the narrow temperature range and the film of dirt, which cannot be entirely eliminated in this environment, or due to interference by electrical and magnetic fields, as well as the higher cost of circuitry.

In the electrical coupling, the insulation of the contacts and the tightness of the contact connections or contact bridges leading into the device are particularly a problem in the environment of use of a wheel revolution counter at the axle of a vehicle, where blows from stones and aggressive media are common and corrosion-resistant steel must accordingly preferably be used for the housing of the wheel revolution counter, and where there are extreme temperature differences, freezing, moisture and electrically conductive dirt. This means that great demands are to be imposed on the contact sealing means with respect to resistance to temperature and aging, and the sealing locations are to be extensively reduced and optimized for a secure sealing effect. On the other hand, the manufacturing conditions ranging from mass production to mechanical assembly must be taken into account in the development of such a device.

SUMMARY OF THE INVENTION

The object of the present invention is accordingly to provide a contact arrangement for an electric wheel revolution counter which can be interrogated via external contacts, which contact arrangement meets the conditions of mass production and satisfies the high demands with respect to leakage current resistance and tightness.

This object is achieved according to the invention by a construction comprising a contact part including a contact plate and at least one projection or shaft formed on or at the contact plate. An insulating bush comprising a collar constructed at a front side is assigned to or associated with the shaft, and a countersinked region which receives the contact plate and an opening corresponding to the diameter of the insulating bush are provided in the housing. A curable adhesive layer is provided in the gap between the housing and the contact plate formed by the collar of the insulating bush.

A preferred embodiment according to the invention is characterized in that a wall of the countersinked region is inclined relative to the surface of the housing, and in that the adhesive layer provided between the contact part and the housing is applied in such a way that it extends out in a halo-like manner on the outer surface of the housing surrounding the contact plate.

The construction of the invention offers various advantages. First, it meets the demands with respect to electrical separation and tightness, with no additional space requirement and with a uniform-surface arrangement of the external contact surfaces; second, it can be realized in a simple manner and is reproducible in mass production. In particular, the collar of the insulating bush offers a defined adhesive gap, and the adhesive can be applied using a screen printing process or by means of brushing it on mechanically. The shortest sealing gap lengths are provided particularly in an embodiment with an axially arranged contact part. On the other hand, a relatively long sealing distance is provided when providing a contact plate which is relatively large compared with the diameter of the insulating bush or its collar.

The various features of novelty which characterize the invention are pointed out with particularity in the claims annexed to and forming a part of this disclosure.

For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

Figure 1:
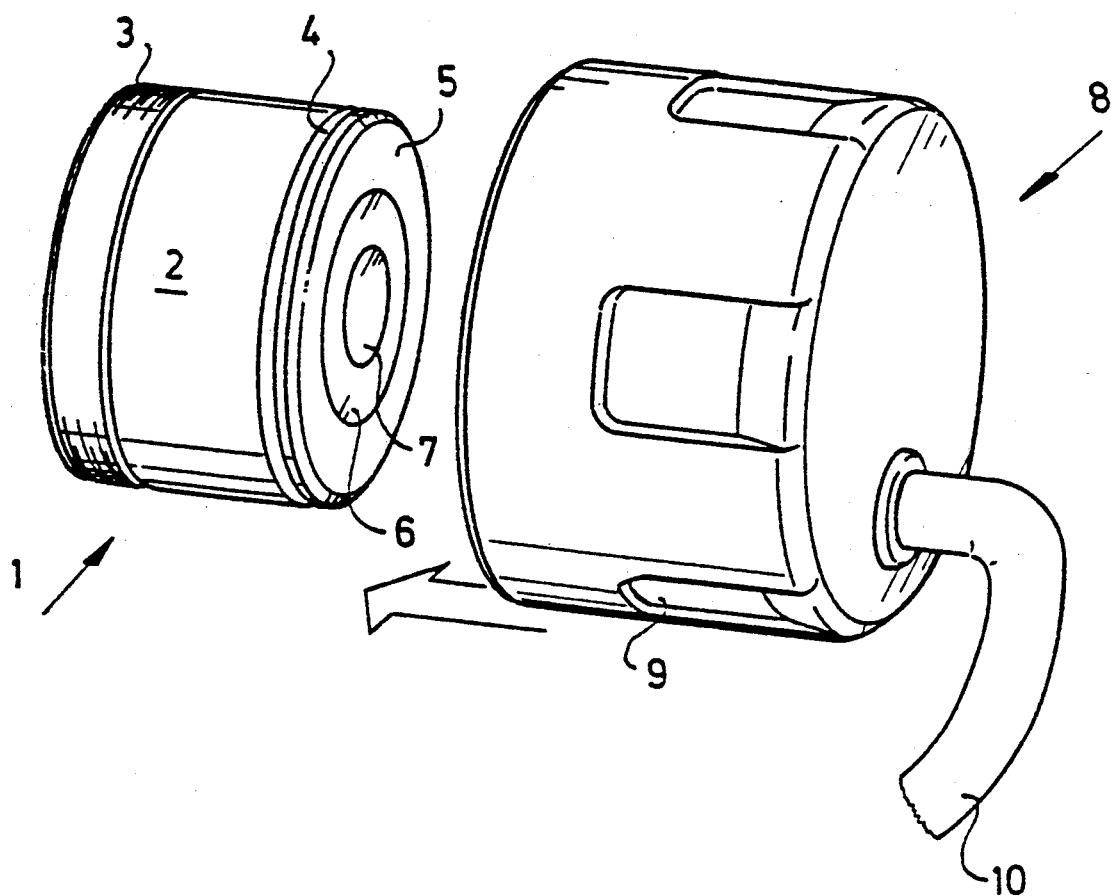
FIG. 1 is a perspective view of one form of a wheel revolution counter according to the invention and a sensing head for connection with the wheel revolution counter for transmitting data.

FIG. 1 shows a wheel revolution counter 1 according to the invention which is to be mounted, e.g., to a passenger vehicle, i.e., connected by means of suitable receiving means, not shown, which are in turn fastened at the vehicle wheel hub. A thread 3 which is formed at the circumference at one end of a housing 2 of the wheel revolution counter 1 can be used this purpose. The housing is preferably hermetically sealed. Provided at the other end of the wheel revolution counter 1 remote from the thread 3 is a groove 4 at the circumference, an annularly-constructed insulating layer in the form of a cured adhesive layer 6 at the flat front side 5 of the housing 2, and a contact part 7 which is insulated relative to the housing 2.

A sensing head constructed as a plug is designated by 8. For the purpose of improved handling—the diameter of the housing 2 of the wheel revolution counter 1 is of the order of about 50 mm—the sensing head 8 is provided with recessed grips, one of which is designated by 9. Further, catch hooks which cooperate with the groove 4 of the housing 2 are constructed inside the sensing head 8—not shown because not essential to the present invention—and spring-mounted contact pins are provided which enter into a working electrical connection with the contact part 7 on the one hand and with the housing 2 on the other hand when the sensing head 8 is placed on the wheel revolution counter 1 as shown, the housing 2 being then incorporated in the interrogation circuit in the selected contact configuration. Since a relatively long attachment length is available, a more secure and relatively firmer seat of the sensing head 8 can be achieved at the wheel revolution counter 1 when a suitable fit is selected, the sensing head 8 being then connected with a data transfer device and/or a stationary data processing device (not shown) via a cable 10. The sensing head 8 remains rotatable relative to the wheel revolution counter 1, so that it is possible to scrape off dirt residue, and accordingly to make a more secure contact, by rotating the sensing head 8 back and forth, i.e., the contact pin (not shown) cooperating with the contact part 7 also acts eccentrically at the contact part 7.

Figure 2:
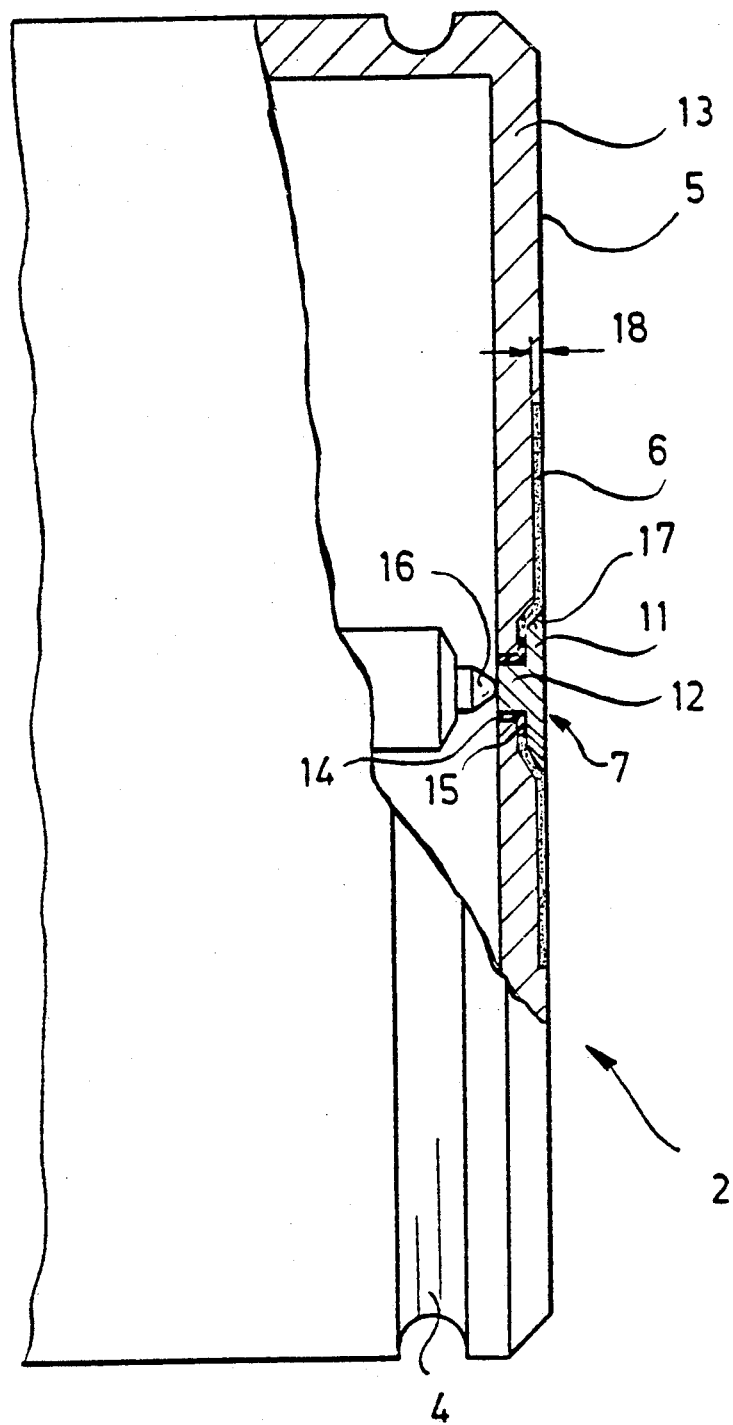
FIG. 2 is a partial cross-section of the wheel revolution counter of FIG. 1 showing the contact arrangement.

As can be seen from the partial section of FIG. 2, the contact part 7, which comprises a disk-shaped contact plate 11 and a shaft 12, is recessed in the respective housing wall 13 of the wheel revolution counter 1 in such a way that it terminates on the outside so as to be flush with the front side 5 of the housing 2. An insulating bush 14, e.g., of a plastic such as Teflon, having a collar 15, serves as insulation between the contact part 7 of metal and the housing wall 13, also typically of metal. The contact part 7, which serves as a contact bridge, communicates electrically with a spring-mounted contact 16 inside the wheel revolution counter 1, the contact 16 being mounted, e.g., on a printed circuit board (not shown). Further, it can be seen that the collar 15 of the insulating bush 14 serving as a spacer creates a defined gap between the contact plate 11 and the housing 2 or the contour of a countersinked region 17 corresponding in shape to that of the contact plate 11. A relatively long adhesive distance, and accordingly a long sealing distance, is achieved by means of the inclined countersinked wall, as well as by means of the correspondingly conically shaped contact plate 11, and any notching effect on the adhesive layer 6 is reduced. It is possible to achieve a planar front wall 5 at the wheel revolution counter 1 and accordingly to simplify the cleaning of the device at the contact side by means of a flat recess 18, corresponding in thickness to that of the adhesive layer 6, e.g., of about 0.3 mm, for receiving the layer 6.

The assembly of the contact arrangement, according to the invention, is preferably effected by applying the adhesive layer 6, e.g., by a screen printing process, and then pressing in the contact part 7 provided with the insulating bush 14, with the collar 15 of the insulating bush 14 serving as a stop, followed by subsequent curing of the adhesive layer 6 to permanently secure the parts together.

For the sake of completeness, it is noted that, because of the aforementioned corrosion environment, and because of the same temperature behavior relative to the adhesive layer 6, the contact part 7 can be produced from the same metal material as the housing 2 or as a cover at which the contact arrangement is constructed, which cover is connectable with the housing 2. It is further noted that the utilized adhesive, which can be one of many commercially available curable epoxy resins, must be resistant to a wide range of temperatures and must be consistent or compatible with respect to the other materials used, i.e., it must have good adhesion to metal.

Figure 4:
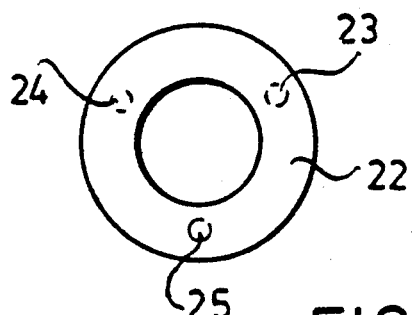
FIG. 4 is a top view of a modified contact part with an annular contact plate.
Figure 3:
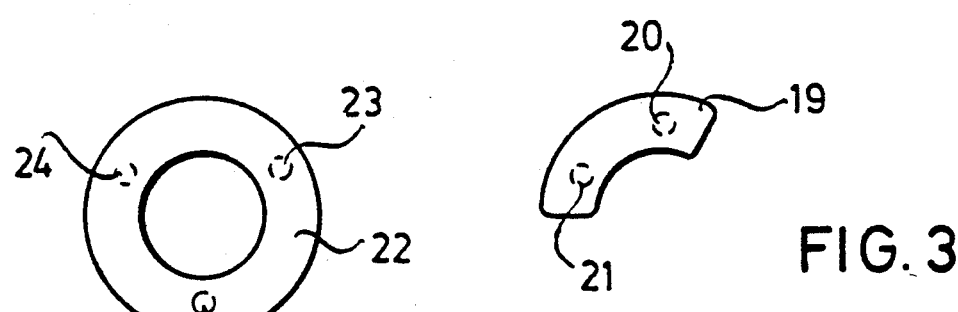
FIG. 3 is a top view of a contact part with an arc-shaped contact plate.

According to FIGS. 3 and 4, the contact plate 7, instead of a circular shape, can also be formed as an arc-shaped segment 19 (FIG. 3) with one or more shafts 20, 21, corresponding to the shaft 12 in FIG. 2. Alternatively, the contact plate constructed as a ring 22 (FIG. 4) with a plurality of shafts 23, 24, 25. In both of these modifications, the fastening, insulation and sealing would be effected in the same manner as in the described preferred embodiment of FIG. 2.

In the use of the contact arrangement as illustrated in FIG. 1, the housing metal forms one contact terminal and the contact plate a second contact terminal. The provision of the halo-like extension of the adhesive layer, extending outwardly well beyond the outer edge of the plate 11 and covering a large surface area, improves the electrical insulation between the plate and the housing terminals.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. A contact arrangement for the electrical interrogation of the data of a wheel revolution counter, comprising a substantially cylindrical metallic housing having means for fastening at a wheel hub of a vehicle and having at the housing front wall at least one contact part which is electrically insulated relative to the housing, characterized in that the contact part comprises:
   a contact plate having at least one projection,
   an insulating bush comprising a collar surrounding the projection and adjacent the contact plate,
   a countersinked region and opening in the housing front wall for receiving the contact plate, said opening in the housing front wall corresponding to the diameter of the insulating bush, said bush collar forming a gap between the housing front wall and the contact plate,
   adhesive means in the said gap and sealing together the housing and the contact plate.

2. A contact arrangement according to claim 1, wherein the projection comprises a shaft, the bush collar serving as a spacer for the contact plate sitting in the countersinked region.

3. A contact arrangement according to claim 2, characterized in that the countersinked region is formed by a wall inclined relative to the surface of the front wall of the housing.

4. A contact arrangement according to claim 2, characterized in that the edge between the countersinked wall and the surface of the housing is rounded.

5. A contact arrangement according to claim 2, characterized in that the adhesive layer provided between the contact part and the housing is arranged in such a way that it extends out over the outer surface of the housing surrounding the contact plate in a halo-like manner.

6. A contact arrangement according to claim 5, characterized in that a flat recess surrounding the countersinked region is provided for receiving the extending area of the adhesive layer such that the front surface of the contact arrangement is planar.

7. A contact arrangement according to claim 2, characterized in that the contact plate comprises a circular disk whose axis parallels that of the housing.

8. A contact arrangement according to claim 2, characterized in that the contact plate comprises an arc-shaped member.

9. A contact arrangement according to claim 2, characterized in that the contact plate comprises a ring, and a plurality of shafts are formed on the ring.

10. A contact arrangement according to claim 2, characterized in that the housing and the contact part are produced from the same material.

11. A contact arrangement according to claim 2, characterized in that a curable epoxy resin is used as the adhesive means.

* * * * *